United States Patent

[11] 3,607,794

[72] Inventors William Abbotson;
John Miles Macnair; Frederick James Wallace; Peter John Hancox, all of Nechells, Birmingham, England
[21] Appl. No. 726,553
[22] Filed May 3, 1968
[45] Patented Sept. 21, 1971
[73] Assignee Conteki Developments Limited London, England
[32] Priority May 12, 1967, July 28, 1967
[33] Great Britain
[31] 32190/67 and 34884/67

[54] PROCESS OF REACTING ORGANIC POLYISOCYANATE WITH ALKALI METAL SILICATE SOLUTION
10 Claims, No Drawings

[52] U.S. Cl. .................................................. 260/2.5 A,
260/2.5 AK, 260/2.5 AM, 260/18 TN, 260/37 N, 260/77.5 R, 260/859 R
[51] Int. Cl. ........................................................ C08g 22/46, C08g 53/08
[50] Field of Search .......................................... 260/2.5 A, 2.5 AM, 37 N, 77.5 A, 77.5 AM, 824, 77.5 AX

[56] References Cited
UNITED STATES PATENTS

| 3,385,345 | 5/1968 | Miraldi | 164/43 |
| 3,004,921 | 10/1961 | Stossel | 252/309 |
| 3,224,899 | 12/1965 | Wilson | 117/98 |

FOREIGN PATENTS

| 250,042 | 7/1960 | Australia | 260/2.5 |
| 1,419,552 | 10/1965 | France | 260/827 |

OTHER REFERENCES

Japanese Patent Specification Publication 39-1850, 7 pages (1964).

Japanese Patent Specification Publication 42-11679, 3 pages (1967).

Chemical Abstracts, Volume 65, page 17166 (1966).

Polymer Science & Technology, Post P, Vol. 2, Number 2, page 26 (1967).

*Primary Examiner*—Donald E. Czaja
*Assistant Examiner*—H. S. Cockeram
*Attorney*—Wolfe, Hubbard, Leydig, Voit & Osann

ABSTRACT: Siliceous products may be made by direct reaction between an alkali metal silicate and an organic isocyanate or isothiocyanate. By varying the proportions, reaction conditions and ingredients used, products varying from light cellular foams, to mastics and high-density solids may be obtained.

PROCESS OF REACTING ORGANIC POLYISOCYANATE WITH ALKALI METAL SILICATE SOLUTION

This invention relates to the production of siliceous products, to products containing a body of siliceous material and to the uses of such products.

According to the present invention there is provided a process for the production of siliceous products which comprises reacting an aqueous solution of an alkali metal silicate with an organic isocyanate or isothiocyanate, preferably an organic polyisocyanate. By variation of the nature and relative proportions of the reactants and the reaction conditions, solid products of differing physical characteristics may be obtained. For example, one may obtain a reaction product having the consistency of a putty, or alternatively a hard dense mass or, yet again, a low density cellular structure or a product in any physical state between the foregoing states.

It is found that the reaction referred to causes the alkali metal silicate solution to set and, whilst the applicants would not wish to be bound by any theory as to why this occurs, it is considered probable that a number of chemical reactions are involved. Thus, it is known that organic polyisocyanates and water react together with the production of polymers of which the structural units are linked together by urea linkages. A byproduct of that reaction is carbon dioxide. It is am almost certain that at least part of the reaction is the production of carbon dioxide and the reaction is the production of carbon dioxide and the reaction of that carbon dioxide with the alkali metal silicate to form a solid silica hydrogel. From the general appearance of the cellular compositions, however, there would appear to be some polymerization occuring which is not explained by the inorganic reactions. The polymer structure may be due to the formation of polyureas or polymerization of the isocyanate into complex isocyanate and/or isocyanurate compounds. An alternate explanation would be the formation of a silicon chain structure through the hydroxyl groups of the silicate reacting with the isocyanate.

Suitable polyisocyanates which be employed in the process of the invention are exemplified by the organic diisocyanates which are compounds of the general formula:

where R is a divalent organic radical such as an alkylene, aralkylene or arylene radical. Suitable such radicals may contain, for example, 2 to 20 carbon atoms.

Examples of such diisocyanates are:
p,p'-dihenylmethane diisocyanate
phenylene diisocyanate
chlorophenylene diisocyanate
tolylene diisocyanate
m-xylylene diisocyanate
benzidene diisocyanate
naphthylene diisocyanate
tetramethylene diisocyanate
pentamethylene diisocyanate
hexamethylene diisocyanate
decamethylene diisocyanate
thiodipropyl diisocyanate.

Other polyisocyanates, polyisothiocyanates and their derivatives may be equally employed. Fatty diisocyanates are also suitable of the general formula

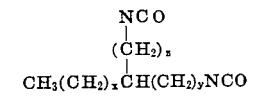

where $x+y$ totals 6 to 22 and $z$ is 0 to 2, e.g. isocyanatostearyl isocyanate. Of the foregoing, p,p'-diphenylmethane diisocyanate has been found in practice to be most suitable. Tolylene diisocyanates, e.g. the 2,4- and 2,6-isomers, are also readily available and suitable for use.

For convenience in description only the isocyanates are referred to in what follows, but it is to be understood that the isothiocyanates behave analogously.

The commercially available aqueous alkali metal silicates have been found to give satisfactory results. Such silicates can be represented as $M_2O \cdot SiO_2$ where M represents an atom of an alkali metal and they differ in the ratio of $M_2O \cdot SiO_2$. It has been found that the sodium silicates are highly satisfactory and while the other alkali metal silicates, e.g. potassium and lithium silicates may be used they are less preferable on economic grounds. Using the preferred sodium silicate, the $Na_2O:SiO_2$ ratio may vary, for example from 1.6:1.0 to 3.3:1.0. However it is found generally to be preferable to employ a silicate of which the said ratio is within the range 2.0:1.0 to 2.3:1.0.

The relative proportions of the alkali metal silicate and the isocyanate may be varied yielding, as noted above, products of different physical characteristics and probably differing chemical structure.

In general it is desirable to employ an excess of the silicate, i.e. a quantity greater than would be stoichiometrically equivalent to the isocyanate employed. On the other hand it is important not to use so little isocyanate that insufficient reaction occurs. Typically, using p,p'-diphenylmethane diisocyanate (which is commercially available at a strength of about 85–90 percent, calculated on a molecular weight of 250), and a sodium silicate of $Na_2O:SiO_2$ ratio of 2.0:1.0 to 2.3:1.0, the weight ratio of silicate to isocyanate may vary from 1:7.75 to 3:1. Within this range the general effect is that at the higher ratios of isocyanate the reaction proceeds very rapidly and the products tend to be of low density whereas at the high ratios of silicate the reaction produces products of higher density.

The direct reaction between the alkali metal silicate solution and the isocyanate normally proceeds only slowly and it is therefore usually convenient to accelerate it. It has been found that acceleration of the reaction may be achieved by the presence of a tertiary amine. Suitable tertiary amines serving as accelerators are, for example, trialkylamines, e.g. triethyl, tripropyl-, tributyl- and triamylamines; dialkylalkanolamines and alkyl dialkanolamines such as N,N-dialkyl ethanolamines such as triethanolamines, pyrimidine, quinoline, dimethylaniline, N-alkylmorpholines, N:N-dimethyl cyclohexylamine, N:N-dimethyl benzylamine and triethylene diamine.

Other compounds having a catalytic or accelerative activity may be used, examples being lead benzoate and oleate, stannic chloride, stannous octoate, lead octoate, bismuth nitrate, antimony trichloride and dibutyl tin dilaurate. Or a mixture of said tertiary amine and a said salt may be used.

The particular physical condition of the final product depends on the particular agents used and their relative proportions. Thus it has been found that if the conditions are adjusted to afford the evolution of a considerable volume of carbon dioxide gas, a foaming of the reaction mixture takes place so that the products set to a highly cellular condition. If desired, the foaming may be assisted by the use of a blowing agent known per se included in the composition, e.g. a volatile fluorinated hydrocarbon such as are sold under the Registered Trade Marks FREON and ARCTON, as for instance, trichlorofluoromethane, or a substance such as azoisobutyronitrile.

The cellular products of the present invention, since they are of low density and high thermal and sound insulating value, are of particular importance. In their production it is convenient to include in the reaction mixture an agent which will held to stabilize or strengthen the cellular structure and render it more uniform.

It has been found that valuable advantages in this connection may be obtained by including in the reaction mixture a surfactant. This may be anionic, cationic or nonionic and a wide variety of such surfactant compounds are available in commerce and may be used, e.g. long chain alkyl sulfates, alkyl benzene sulfonates, alkyl naphthalene sulphonates, and like anionic agents, cetyltrimethyl ammonium salts and like cationic agents and the ethylene oxide condensates per se or with phenols or amines and like nonionic agents. It has been found in practice that the nonionic agents are generally to be preferred. Silicones, i.e. polysiloxanes, also serve as useful foam stabilizing agents.

The reaction characteristic of the process of the invention is preferably carried out at ambient temperatures, e.g. 15° to 25° C. Higher temperatures tend to accelerate the reaction but may make it more difficult to control.

In carrying out the process of the present invention there may advantageously be present in the reaction mixture, as indicated above, in addition to the isocyanate and the silicate, an accelerator or catalyst for the reaction, a foaming agent and a foam stabilizing agent. In general it is found to be preferable that the ratios of the main ingredients, isocyanate and silicate, to be additives should be approximately the following:

Ratio of silicate to catalyst or accelerator, 40 to 60:1
Ratio of silicate to added foaming agent, 12 to 15:1
Ratio of isocyanate to foam stabilizing agent, 12 to 18:1.

It is to be understood, however, that there may be other additives to the reaction mixture and that these may either take part in the reaction or may remain unchanged but exist dispersed in the final product.

In the former category are additives known per se to take part in the isocyanate polymer-forming reaction, e.g. polyols such as hexane triol.

In some cases it is uncertain whether the additive takes part in any reaction or not. Thus, for example, it has been found that the characteristics of the products may be usefully modified by the inclusion of preformed polymers such as polyvinyl acetate, the copolymers of vinyl acetate and acrylic acid or methyl acrylate or methyl methacrylate, and copolymers of styrene with acrylic acid, methyl acrylate, methyl methacrylate or other ethylenically unsaturated monomers. However the said polymers may contain some residual hydroxyl groups which react with the isocyanate. Wholly hydrocarbon polymers such as polyethylene are generally less effective additives.

A particular useful aspect of the invention derives from the inclusion in the reaction mixture of inert solid substances which, by reason of the reaction are thus distributed in the solid matrix of the end product. Thus, the invention may be applied to the production of rigid products in which the alkali metal silicate solution constitutes a precursor for a binding agent for a filler material, i.e. is converted by the process of this invention to a rigid matrix binding the particles together. The filler materials may be organic or inorganic, fibrous or particulate, or mixtures of any of these, such as sand, alumina, alumino-silicates, magnesia, and other particulate refractories; metal fibers, asbestos, glass fiber, rock wool, aluminosilicate, calcium silicate fibers and other fibrous refractories; wood flour, coke and other organic or carbonaceous particles; paper pulp, cotton waste, cotton, jute, sisal, hemp, flax, rayon, or synthetic fibers such as polyester, polyamide and acrylonitrile fibers and other organic fibrous materials.

In this aspect of the invention, the process is of special value in the production of heat-insulating shaped products for use in the metallurgical industry, e.g. in the foundry industry to constitute the binding system in sand mould and core-making operations or to constitute linings in the feedhead and risers of metal casting moulds.

Further, the particulate material may comprise ingredients which react together exothermically when ignited, e.g. aluminothermic compositions, which are useful in the production of linings as aforesaid.

Thus, the particulate materials may be, for example, a mixture of finely divided aluminum, oxidizing agent therefor (e.g. a nitrate or chlorate, or iron oxide or manganese dioxide) along or together with particulate refractory material as aforesaid. In the case of the aluminothermic compositions it is preferred that the quantity of oxidizing agent should be stoichiometrically insufficient to react with all the aluminum present and that the composition should contain a small proportion of a fluoride, e.g. cryolite, aluminum fluoride or a complex fluoride such as fluoborate, fluotitanate or fluosilicate.

Cellular products made according to the present invention are not always sufficiently resistant to penetration by molten metal to permit their successful use in the lining of hot tops, risers, or the like in foundry practice. Where this is the case it is desirable to provide that the surface which is to contact the molten metal is of nonfoamed structure.

This nonfoamed surface structure may be achieved in a number of different ways. The foamed material may be provided, for example, with a facing layer resistant to metal penetration and, in some cases, more refractory than the foamed insulator. Such a layer may consist of a particulate refractory material, e.g. core sand, silica flour, alumina, bonded with a binder such as core oil or furane resin. Such a refractory layer is preferably 1.5–4 mm. thick, most preferably about 2.5 mm. thick.

Other suitable refractory coatings which may be employed include one comprising particulate refractory material, up to 5 percent of a binder effective at room temperature, 0.5 to 5 percent of a binder effective at high temperature and 0.1 to 10 percent of a suspending agent usually dispersed in a liquid medium, preferably water and one comprising chromic oxide and an inorganic binding agent therefor, usually dispersed in a liquid medium, preferably water. These refractory coatings may be applied to the slabs of foamed heat-insulating material by any suitable method such as spraying or painting.

An alternative method of securing a nonfoamed surface structure is partially to defoam the slab during manufacture. This may be effected, for example, by spraying a defoaming agent onto the mould walls. Suitable defoaming agents are hexanol and nonanol. The collapse of the foam at the surface gives, in the final slab, an integrally formed nonfoamed structured surface which is highly resistant to molten metal penetration.

Where the foamed refractory heat insulative material is formed in situ in the head of an ingot mould or in a head box, the inner dimensions of the foamed insulator are generally controlled by inserting into the head box or mould head opening a former, generally made of cardboard. Foamed insulator precurser is then brought into the space between the former and the mould or head box walls and there caused to foam and set to give solid refractory foamed heat-insulative material. By suitably coating the foam-contacting walls of the former, the foam may be defoamed on contact with the former walls, giving a nonfoamed surface to the insulating material after the cardboard former has been removed. Alternatively, the cardboard former may bear a refractory coating as described above which will be transferred to the face of the foamed insulator when the insulator foams and sets, and from which the cardboard former may subsequently be stripped.

As will be apparent from the foregoing description, the products of the invention having a cellular structure are good thermal insulants and therefore have a wide application in the insulation industry. Generally, insulants have been divided into two categories: organic for low-temperature application and inorganic for use in the high-temperature field. The foam products of the present invention combine the properties of both types.

The process of the invention thus affords the possibility of obtaining compositions having a high inorganic content and cellular products thus produced are considerably less combustible than the more conventionally known foamed plastics materials such as polystyrene and polyurethane.

It is well known to use low-density foamed polyurethanes for the production of insulating and packaging materials but they suffer from the disadvantage of being somewhat flammable thereby presenting a fire hazard. The compositions of the present invention are either flame proof or at least self-extinguishing. The relative noninflammability of the products of this invention thus lends particular value to their use in constructional applications e.g. as fire- and flame-resistant heat and sound-insulating boards; as sprayed compositions for anticondensation insulation and fire resistance; as packaging materials; for sealing rock faces to prevent oxidation and erosion in the mining industry. The noncellular products may be used to great advantage as mastics or sealing compounds or as cements and bonding agents.

The following examples will serve to illustrate the invention:

EXAMPLE 1

A composition was prepared from the following ingredients;

| | |
|---|---|
| Sodium silicate solution (% solids-SiO$_2$:Na$_2$O=2:1) | 20 parts by weight |
| p,p'-diphenylmethane diisocyanate | 8 parts by weight |
| Trichlorofluoromethane | 2 parts by weight |
| Silicone foam stabilizer (Silcocell 380, manufactured by Imperial Chemical Industries Limited) | 1 part by weight |
| Amine Catalyst (a mixture of 3 parts of N-β-hydroxyethyl dimethylamine and 1 part of percent triethylene diamine) | 4% by weight based upon the isocyanate present. |

All the ingredients except the isocyanate were thoroughly mixed together and the isocyanate was mixed in immediately before required use. The liquid was produced could be poured into suitable moulds for the manufacture of foamed slabs and shapes or could be poured into the position required for foaming in situ, e.g. for insulating above ceilings, or within a mould built around a steel constructional support or the like. The product had a density of 19 lbs./cubic foot.

EXAMPLE 2

A further composition was prepared by mixing, in the same order as in example 1 the following ingredients:

| | |
|---|---|
| Sodium silicate solution (as in example 1) | 20 parts by weight |
| p,p'-diphenylmethane diisocyanate | 40 parts by weight |
| Silicone foam stabilizer (as in example 1) | 1 part by weight |
| Amine Catalyst (as in example 1) | 4% by weight of the isocyanate. |

This composition is suitable for heat and sound insulating and packaging purposes but is less suitable as a fire protective composition. It has a density of 0.66 noninflammable foot. than The compositions according to example 1 are noninflammable foams and are mechanically stronger than those according to example 2. Very little smoke is produced when a flame is applied to such compositions.

The compositions of example 2 are self-extinguishing but not entirely fireproof, and greater volumes of smoke are produced when contacted by flame. They are very good insulators but are mechanically weaker.

Although both the foregoing examples employ the same sodium silicate solution, solutions of any other alkali metal silicate may be used to similar effect. Furthermore other polyisocyanates may be employed, e.g. any of those listed above. The proportions of active ingredients specified in the above examples represent a particularly useful range but may need to be modified according to the polyisocyanates used. Compositions manufactured using intermediate proportions have accordingly graded characteristics.

In order to improve the fire protective properties of these materials a small proportion of inorganic fibrous material, e.g. 1-2 percent by weight of asbestos, may be included in the compositions. It is also possible, if desired to include in the compositions flame-resistant materials known per se, e.g. phosphates.

EXAMPLE 3

The following composition was mixed in a core sand mixer:

| | |
|---|---|
| Silica sand | 100 parts by weight |
| Sodium silicate solution (as in example 1) | 4 parts by weight |
| Diphenylmethane diisocyanate | 1 part by weight |
| Tributylamine (accelerator) | 2 parts by weight |

The sand and silicate were first mixed together for 2 minutes, and mixing was continued for a further 2 minutes after the addition of the other ingredients. The resulting mixture, which had a bench life of about 10 minutes, was formed into sand moulds and cores. Iron castings were made using these moulds and cores, using a pouring temperature of 1,400° C. The moulds and cores performed well, but nevertheless were easily stripped from the resulting castings.

EXAMPLE 4

A further composition suitable for the manufacture of foundry moulds and cores is as follows:

| | |
|---|---|
| Fine silica sand | 100 parts by weight |
| Sodium silicate solution (as in example 1). | 6 parts by weight |
| Diisocyanate (as in example 1) | 1 part by weight |
| Amine catalyst (as in example 1) | 0.25% by weight based on the Diisocyanate |

EXAMPLE 5

Insulating boards of greatly increased mechanical strength were made by pouring the reaction mixture of example 4 into a slab mould, which had been loosely filled with glass fibers, closing the mould and allowing the mixture to foam through the fibers. For such purposes it is preferable to use long-fibered materials, as in the so-called "glass rovings," as the fibers may then be orientated readily into whichever plane (or planes) is required when packing the mould. Generally it is convenient to employ about 10–15 percent by weight of glass fibers, based upon the weight of the reaction mixture.

The degree of foaming of the products can be controlled by the quantity and nature of the surfactants, blowing agents, etc., which are used. In the following example a completely nonfoamed product is obtained.

EXAMPLE 6

| | |
|---|---|
| Sodium silicate solution (as in example 1) | 60 parts by weight |
| Diisocyanate (as in example 1) | 20 parts by weight |
| Armeen DM 16D (Alkyl dimethyl-amine in which the alkyl group is predominantly polymity). | 1 part by weight |

These ingredients reacted to give a hard, nonfoamed material with a density of about 58 lbs./cubic foot. It may be used as a very rapid setting cement.

EXAMPLE 7

In the manufacture of steel ingots, insulating tiles for lining the head of the ingot moulds were prepared in the following manner: the ingredients listed below were thoroughly mixed together, the diisocyanate being added after the remaining constituents had been brought to a homogeneous mixture.

| | |
|---|---|
| Sodium silicate (as in example 1) | 13.1 parts by weight |
| Silcocell 380 (as in example 1) | 0.7 parts by weight |

Table — Continued

| | |
|---|---|
| Trichlorofluoromethane | 4.8 parts by weight |
| Amine catalyst (as in example 1) | 0.25 parts by weight |
| Fine Silica sand (−60 mesh BSS) | 72.5 parts by weight |
| Slag wool fibers | 2.05 parts by weight |
| Diisocyanate (as in example 1) | 6.6 parts by weight |

The mixture was then poured into slab moulds measuring internally 9inches × 9inches × 2inches, one large face of which was constituted by a 5 mm. thick plate of silicate-bonded sand (fine silica sand bonded with 6 percent by weight sodium silicate solution and dried). The tiles were stripped from the moulds, after the reaction was complete, as duplex bodies having a dense (2 g./cc.) facing of silicate-bonded sand and a 2 inch thick, low density (0.51 g./cc.), heat insulating backing. They were used to line the heads of ingot moulds, the dense surface facing towards the interior of the mould to contact the molten metal when the moulds were filled.

We claim as our invention:

1. A process for the production of a silica-containing refractory product which consists essentially of reacting together an aqueous solution of an alkali metal silicate and an organic polyisocyanate in the presence of an inert material selected from the group consisting of particulate materials, fibrous and mixtures thereof and in the absence of a preformed resin.

2. A process according to claim 1 wherein the said polyisocyanate is selected from the group consisting of p,p'-diphenylmethane diisocyanate and tolylene diisocyanate.

3. A process according to claim 1 wherein the alkali metal silicate is sodium silicate of which the $Na_0:SiO_2$ ratio of the sodium silicate is within the range of about 1.6:1 to about 3.3:1.

4. A process according to claim 3 wherein the $Na_2O:SiO_2$ ratio is within the range of about 2.0:1 to about 2.3:1.

5. A process according to claim 1 wherein the silicate is employed in excess over the quantity stoichiometrically necessary to react with said polyisocyanate.

6. A process according to claim 1 wherein the silicate is sodium silicate with a $Na_2O:SiO_2$ ratio in the range of about 2.0:1 to about 2,3:1, the isocyanate is p,p'-diphenylmethane diisocyanate having about a 90 percent purity and the weight of ratio of silicate to isocyanate is in the range of about 1:7.75 to about 3:1.

7. A process according to claim 1 wherein the reaction is effected in the presence of a tertary amine catalyst.

8. A process according to claim 1 wherein the reaction is effected in the presence of a foaming agent.

9. A process according to claim 1 wherein a foam stabilizing agent is included in the reaction mixture.

10. A process according to claim 1 wherein the particulate and fibrous materials are refractory materials.